Jan. 7, 1930.  L. M. ELLISON  1,742,203
STEAM CALORIMETER
Filed Feb. 11, 1928
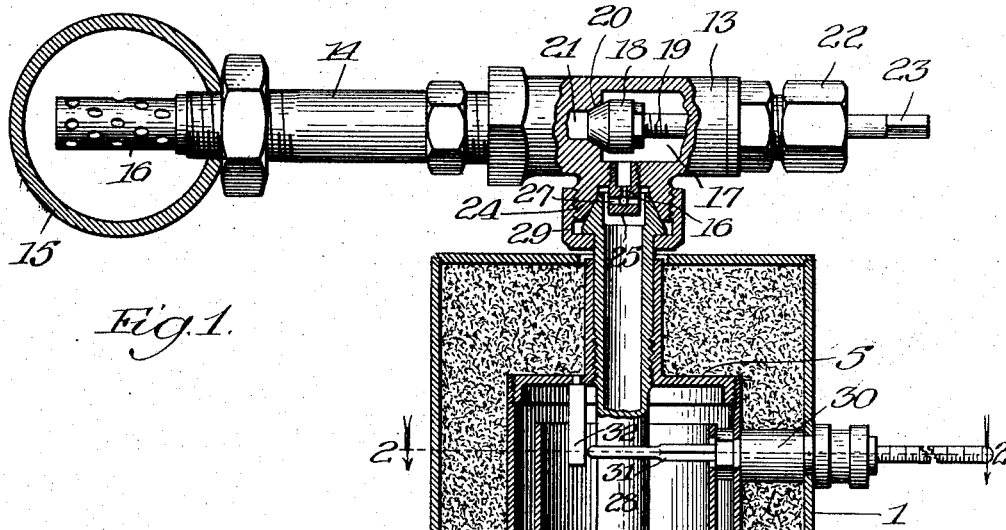
Fig. 1.
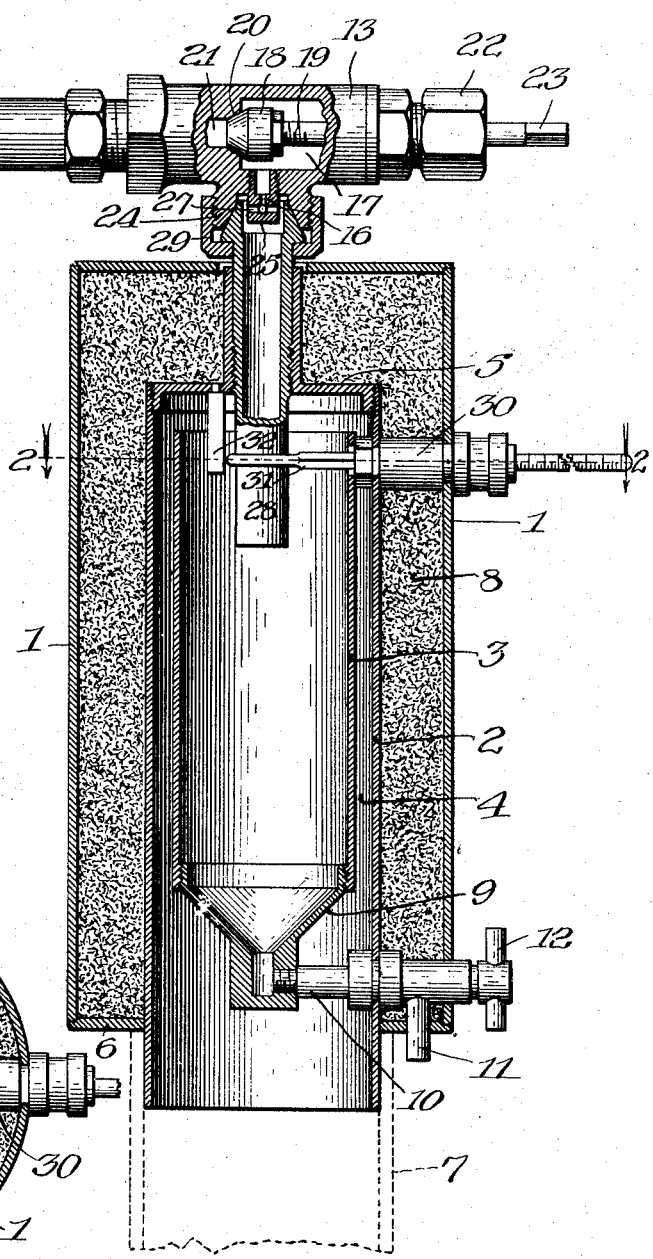
Fig. 2.
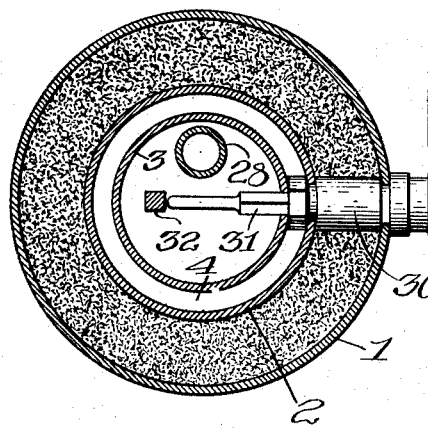
Inventor:
Lewis M. Ellison, Patented Jan. 7, 1930

1,742,203

UNITED STATES PATENT OFFICE

LEWIS MARTIN ELLISON, OF CHICAGO, ILLINOIS

STEAM CALORIMETER

Application filed February 11, 1928. Serial No. 253,621.

This invention relates to improvements in steam calorimeters and consists in the matters hereinafter described and claimed.

In the accompanying drawings—

Fig. 1 is a vertical sectional view, with parts in elevation, of a steam calorimeter constructed in accordance with my invention; and Fig. 2 is a horizontal sectional view taken on line 2—2 of Fig. 1.

The instrument has an outside metal case 1 and two inside metal casings 2, 3. The latter are preferably cylindrical in shape with the inner one 3 of a smaller diameter than the outer one 2, and arranged one within the other in concentric relation to provide an annular space 4 between them. The casing 3 forms the steam receiving chamber of the instrument, while the casing 2 provides a surrounding jacket for the chamber 3. The jacket 2 is made longer than the chamber 3 and extends above and below the latter. A screw-threaded or other cap 5 closes the upper end of the jacket 2, while its lower end extends through the bottom wall 6 of the outside case 1 and is open to the atmosphere through an exhaust tube 7 which fits over the projecting end of the jacket 2 and, in carrying the escaping steam away from the same, insulates its steam outlet end against the possibility of chilling.

The upper end of the steam chamber 3 is open and, terminatnig short of the cap 5, allows steam to flow from the chamber 3 into the jacket 2 over the upper edge of said chamber and by the space 4 surrounds said chamber with a jacket of steam of the same temperature as the steam within the chamber. The jacket of steam surrounding the steam chamber 3 is kept at the same temperature as the steam in the chamber by insulation of the jacket 2 against chilling. This is effectively accomplished by packing the outside case 1 about the jacket 2 with a filling 8 of suitable heat insulating material, such as lamp black. All radiation losses are minimized by the compact design, and further heat retention is insured by having the outside case 1 of brass highly polished and nickel-plated. This arrangement of steam jacket, insulated jacket, and bright exterior surface provides in one instrument the three best known methods of reducing calorimeter radiation losses. The provision of the steam jacket about the steam chamber is an important feature of my invention as the heat conduction from the steam chamber is eliminated, resulting in the calorimeter giving the closest approach to theoretical temperatures ever made possible in steam calorimetry.

The lower end of the steam chamber 3 is closed by a conical bottom 9, preferably screwed in place and connected with a drain fitting 10 which extends horizontally outward from said botom 9 through the jacket 2 and outside case 1, respectively. The outlet spout 11 of the fitting 10 extends outward through the bottom wall 6 of the outside case 1 and is opened and closed by a needle or other valve (not shown) located in the fitting and having an operating handle 12 exterior of the case 1 for accessibility, as shown. Being at the lower end of the chamber 3, the drain is located in the steam outlet of the jacket 2 and will not conduct heat from the steam chamber 3. The fitting 10 being carried by the jacket 2 and outside case 1 and being secured to the bottom 9, supports the steam chamber 3 in place in said jacket.

At the top of the instrument and constituting a part thereof is a horizontally disposed valve fitting 13 provided with a similarly disposed nipple 14 which is threaded at its outer end for screwing into a hole tapped in the side of a steam pipe 15 carrying the steam to be tested. The nipple 14 in its outer end is tapped for holding any one of a number of interchangeable perforated sampling tips 16 which extend into the steam pipe 15 from the nipple and are made in different lengths for steam pipes of different diameters. The fitting 13 has a valve chamber 17 in which is located a suitable tapered valve 18 carried at the inner end of a threaded stem 19 and movable thereby on and off a beveled seat 20 at the inner end of a passage 21 also provided in the fitting and leading to the nipple 14. The stem 19 extends outside of the fitting 13 through a gland nut 22 and is there arbored, as at 23, to be operated with a removable socket wrench or other tool (not shown), thus eliminating the use of a handle wheel to radiate heat and facilitate the covering of the entire stem with tissue paper when the instrument is in use.

At the valve chamber 17, the fitting 13 has a depending lug 24 into which is screwed or otherwise removably fitted any one of a number of interchangeable throttling plugs 25, which plugs have orifices 26 of different diameters as required for different steam pressures. The orifice 26 of a plug when in place opens at its upper end into the valve chamber 17 and receives steam therefrom when the valve 18 is moved off its seat. The lower end of the orifice opens into a pair of cross-passages 27, 27 by means of which the steam is divided into four atomized streams, which meet and mix below the plug in the upper end of a tube 28. The latter is coupled to the lug 24 by a union 29, there being coacting beveled surfaces between them, as shown. The union, being on the outside side of the plug 25, is under only atmospheric pressure and is not subjected to leakage. The tube 28 is open at its lower end and extends down into the steam chamber 3 at one side thereof, as shown in Fig. 2. This causes the steam to take a U-path in its flow through the chamber 3, first down one side of the chamber 3 from the tube 28 and then up the other side of the chamber to reach the jacket 2 over the upper end of the chamber 3.

A thermometer holder 30 is clamped between the jacket 2 and the outside case 1 adjacent the upper end of the steam chamber and supports a suitable thermometer 31 which has its inner or bulb end extending from the holder into the steam chamber 3 so as to be directly in the steam bath in said chamber. The outer or scale end of the thermometer 31 is outside of the case 1 so that it may be conveniently read. The holder 30 forms a packing cup for the thermometer 31 and, in terminating in the jacket 2, prevents the conduction of heat from the steam chamber 3 by both the holder and the thermometer. The thermometer 31 is gas filled, reading up to any desired number of degrees, say 400° F., and is graduated for two inch immersion.

The device shown and described operates as follows. After the instrument is attached to the pipe 15, carrying the high temperature and high pressure steam to be tested, the valves 10 and 18 are opened and steam flows through the instrument to heat up the jacket 2 and steam chamber 3 to remove the chill therefrom before testing the steam to determine the percentage of the moisture or quality of the steam. After the chamber 3 and jacket 2 are thoroughly heated to the temperature of the steam, the drain valve 10 is closed after all condensate produced in the chamber 3 by reason of its original chill is removed, so that no moisture will be present in said chamber to effect the accuracy of the test to follow. The valve 18 being left open, the steam to be tested continues to flow through the instrument. On passing through the orifice 26 of the throttling plug 25, the pressure of the steam drops to substantially atmospheric pressure in the chamber 3 due to the fact that said chamber is open to the atmosphere through the jacket 2 and the exhaust tube 7. The high temperature steam in dropping its pressure gives off its superheat and that is registered by the thermometer 31. The difference between the temperature of the steam in the pipe 15 and 212° F. (the temperature at which steam forms at atmospheric pressure) gives the theoretical temperature of the superheat. The difference between this temperature and the actual temperature of the superheat, as shown by the thermometer 31, will indicate the temperature which has been utilized in evaporating the excess moisture carried by the steam in pipe 15. From this difference may be figured by proper formula the percentage of moisture or the quality of the steam. For example, suppose the gage pressure of the steam in pipe 15 is 100 pounds and the temperature of the superheat in the steam chamber 3 is 70° F., formula for determining the moisture in steam in throttling calorimeters shows that the percentage of moisture in the steam is about .6 of 1%. This accuracy is made possible due to the insulation of the chamber 3 by a jacket of steam of about the same temperature as the steam within the chamber.

A momentary abnormal moisture content in excess of the throttling process (at the plug 25) is separated in the steam chamber 3, but by the U-flow of the steam through this chamber this moisture is re-evaporated by the superheated steam after the period of excess, giving a true average superheat temperature at the thermometer 31. The instrument thus forms a combined throttling, separating, and re-evaporating calorimeter in a single chamber, utilizing the U-path of superheated steam which is the most efficient method of calorimeter moisture evaporation.

The details of structure and arrangement of parts shown and described may be variously modified and changed without departing from the spirit and scope of my invention.

I claim as my invention:

1. In a steam calorimeter, an elongated steam chamber closed at one end and having an outlet for steam at its opposite end, means for discharging steam into said chamber toward the closed end thereof, means for registering the temperature of the steam in said chamber, and means for causing the steam as it is discharged from said chamber to flow along the outside of said chamber from its outlet to its closed end so as to jacket the chamber throughout its entire length with steam having substantially the same temperature as the steam in said chamber.

2. In a steam calorimeter, an elongated steam chamber closed at one end and having an outlet for steam at its opposite end, a jacket about said chamber and providing a steam receiving space about the same, said jacket being in communication with the outlet end of said chamber and having an outlet for steam adjacent the closed end of said chamber, means for admitting steam into said chamber, and means for registering the temperature of the steam in said chamber.

3. In a steam calorimeter, an elongated steam chamber closed at one end and having an outlet for steam at its opposite end, a jacket about said chamber and providing a steam receiving space about the same, said jacket being in communication with the outlet end of said chamber and having a steam outlet adjacent the closed end of said chamber, means for admitting steam into said chamber, means for registering the temperature of the steam in said chamber, and heat insulating means about said jacket.

4. In a steam calorimeter, an elongated steam chamber closed at one end and having an outlet for steam at its opposite end, a jacket about said chamber and providing a steam receiving space about the same, said jacket being in communication with the outlet end of said chamber and having a steam outlet adjacent the closed end of said chamber, means for admitting steam into said chamber, means for registering the temperature of the steam in said chamber, a casing about said jacket, and a filling of heat insulating material packed in said casing about said jacket.

5. In a steam calorimeter, an elongated steam chamber closed at one end and open at its opposite end, a jacket about said chamber and providing a steam receiving space about the same, said jacket extending along, and beyond the opposite ends of said chamber and having an outlet for steam beyond the closed end of said chamber, a closure for the end of the jacket adjacent the open end of said chamber, a steam admitting tube extending into said chamber through said closure, and means for registering the temperature of the steam in said chamber.

6. In a steam calorimeter, an elongated steam chamber closed at one end and open at its opposite end, a jacket about said chamber and providing a steam receiving space about the same, said jacket extending along and beyond the opposite ends of said chamber and having an outlet for steam beyond the closed end of said chamber, a closure for the end of the jacket adjacent the open end of said chamber, a casing about the closure and the greater portion of the jacket, a filling of heat insulating material packed in said casing about the jacket and its closure, a steam admitting tube extending into the chamber through the casing and said closure, and means for registering the temperature of the steam in said chamber.

7. In a steam calorimeter, an elongated steam chamber closed at one end and having an outlet for steam at its opposite end, a jacket about said chamber and providing a steam receiving space about the same, said jacket being in communication with the outlet end of said chamber and having an outlet for steam adjacent to the closed end of said chamber, a steam admitting tube extending into said chamber at one end thereof, and means for registering the temperature of the steam in said chamber.

8. In a steam calorimeter, an elongated steam chamber closed at its lower end and having an outlet for steam at its opposite end, a jacket about said chamber and providing a steam receiving space about the same, said jacket being in communication with the outlet end of said chamber and extending beyond the closed end thereof where the jacket has an outlet for steam, means for admitting steam into said chamber, means for registering the temperature of the steam in said chamber, and a drain fitting for said chamber at its closed end, said fitting being fixed to said jacket and serving as a support for the chamber in said jacket.

9. In a steam calorimeter, an elongated steam chamber, means for admitting to said chamber the steam the moisture content of which is to be determined and for causing the steam to flow in a U-path through said chamber, means providing an exhaust for the steam from said chamber, means for throttling the steam as it is admitted into said chamber, means whereby said chamber may be surrounded by a jacket of steam of practically the same temperature as the steam in said chamber to prevent the transfer of heat from said chamber, and means for registering the temperature of the steam in said chamber.

10. In a steam calorimeter, a vertically disposed cup-shaped steam chamber, a jacket about said chamber and communicating therewith over the upper edge of said chamber, means for admitting steam into said chamber through its upper end, said jacket having its lower end forming a steam outlet and extending below said chamber, a drain fitting at the lower end of said chamber and extending across the space between the chamber and jacket, and a thermometer extending into said chamber adjacent its upper end for registering the temperature of the steam in said chamber.

11. In a steam calorimeter, an elongated upright steam chamber, a jacket surrounding said chamber and communicating therewith over the upper edge of said chamber, said jacket having its lower end forming a steam outlet below said chamber, a valve fixture above said jacket and having a steam conveying tube extending downward into said chamber at one side thereof, a sampling pipe connected with said valve fitting, and manually operable valve in said fitting between said pipe and said tube for controlling the flow of steam to the latter.

12. In a steam calorimeter, an elongated upright steam chamber, a jacket surrounding said chamber and communicating therewith over the upper edge of said chamber, said jacket having its lower end forming a steam outlet below said chamber, a valve fixture above said jacket and having a steam conveying tube extending downward into said chamber, a sampling pipe connected with said valve fixture, a valve in said fixture between said pipe and said tube, and a manually operable stem mounted in said fixture and connected with said valve for opening and closing the same, said stem having a wrench engaging portion at its outer end.

In testimony whereof I affix my signature.

LEWIS MARTIN ELLISON.